(12) United States Patent
Van Endert (10) Patent No.: US 10,172,214 B2
(45) Date of Patent: Jan. 1, 2019

(54) POWER-OVER-ETHERNET POWER DISTRIBUTION SYSTEM

(71) Applicant: PHILIPS LIGHTING HOLDING B.V., Eindhoven (NL)

(72) Inventor: Tony Petrus Van Endert, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/128,421

(22) PCT Filed: Mar. 13, 2015

(86) PCT No.: PCT/EP2015/055277
§ 371 (c)(1),
(2) Date: Sep. 22, 2016

(87) PCT Pub. No.: WO2015/144457
PCT Pub. Date: Oct. 1, 2015

(65) Prior Publication Data
US 2017/0111976 A1    Apr. 20, 2017

(30) Foreign Application Priority Data
Mar. 24, 2014 (EP) .................................. 14161354

(51) Int. Cl.
*G06F 1/00* (2006.01)
*H05B 37/02* (2006.01)
*H04L 12/10* (2006.01)

(52) U.S. Cl.
CPC ......... *H05B 37/0254* (2013.01); *H04L 12/10* (2013.01)

(58) Field of Classification Search
CPC ........................... H04L 12/10; H05B 37/0254
See application file for complete search history.

(56) References Cited

U.S. PATENT DOCUMENTS

| | | | |
|---|---|---|---|
| 7,337,336 B2 * | 2/2008 | Ferentz | G06F 1/30 713/300 |
| 7,478,251 B1 * | 1/2009 | Diab | G06F 1/189 307/38 |

(Continued)

FOREIGN PATENT DOCUMENTS

| | | |
|---|---|---|
| CN | 102664741 A | 9/2012 |
| WO | 2006077570 A1 | 7/2006 |

(Continued)

*Primary Examiner* — Alexander H Taningco
*Assistant Examiner* — Kurtis R Bahr (57) ABSTRACT

The (Power-over-Ethernet) power distribution system comprises a lighting unit (40-80) for producing light. The power distribution system further comprises at least two (Power-over-Ethernet) switch units (20, 30) each having a plurality of ports (25, 35). The at least one lighting unit (40-80) is coupled to at least a first port of the first switch unit and a second port of the second switch unit. The switch units further each comprise a power supply unit (21, 31) for supplying power for the respective plurality of ports (25) and the at least one lighting unit (40-80). The power distribution system furthermore comprises at least one load management unit (100) for controlling the power supplied by the respective power supplies of the switch units to the at least one lighting unit (40-80) such that the power efficiency of the distribution system is optimized.

7 Claims, 6 Drawing Sheets

(56) References Cited

U.S. PATENT DOCUMENTS

| | | | |
|---|---|---|---|
| 7,587,289 B1* | 9/2009 | Sivertsen | F21K 9/00 |
| | | | 362/147 |
| 2006/0053324 A1* | 3/2006 | Giat | H04L 12/10 |
| | | | 713/300 |
| 2006/0063509 A1* | 3/2006 | Pincu | G06F 1/266 |
| | | | 455/402 |
| 2007/0021094 A1 | 1/2007 | Elkayam et al. | |
| 2011/0241425 A1 | 10/2011 | Hunter, Jr. et al. | |
| 2012/0223650 A1 | 1/2012 | Mansfield | |
| 2013/0144448 A1 | 6/2013 | Luerkens et al. | |
| 2013/0145181 A1 | 6/2013 | Maniktala | |
| 2013/0151025 A1* | 6/2013 | Wendt | H05B 33/0842 |
| | | | 700/295 |
| 2013/0191654 A1 | 7/2013 | Schlichter | |
| 2015/0163881 A1* | 6/2015 | Pederson | H05B 33/0863 |
| | | | 315/154 |

FOREIGN PATENT DOCUMENTS

| | | |
|---|---|---|
| WO | 2008134433 A1 | 11/2008 |
| WO | 2012028981 A1 | 3/2012 |
| WO | 2013128339 A2 | 9/2013 |

* cited by examiner

POWER-OVER-ETHERNET POWER DISTRIBUTION SYSTEM

CROSS-REFERENCE TO PRIOR APPLICATIONS

This application is the U.S. National Phase application under 35 U.S.C. § 371 of International Application No. PCT/EP2015/055277, filed on Mar. 13, 2015, which claims the benefit of European Patent Application No. 14161354.7, filed on Mar. 24, 2014. These applications are hereby incorporated by reference herein.

FIELD OF THE INVENTION

The invention relates to a Power-over-Ethernet power distribution system, a method of power distribution and computer program for distributing power.

BACKGROUND OF THE INVENTION

A power supply or power sourcing equipment (PSE) in accordance with the Power-over-Ethernet (PoE) standard uses Ethernet cables for supplying direct current DC voltage to powered devices (PD) like lighting devices or the like. Power-over-Ethernet systems are defined in IEEE 802.3.af and IEEE 802.3.at standard. The Power-over-Ethernet systems allow a DC low voltage supply over low cost Ethernet cables (Cat5/6 cables). The Power-over-Ethernet system according to the IEEE standards allows a power of up to 25.5 W (at 42.5 V-57 V). In other words, an Ethernet network cabling environment is used as an independent DC power supply.

US 2012/0223650 A1 discloses a Power-over-Ethernet system for supplying lighting devices as powered devices with energy.

As Power-over-Ethernet power supply systems are believed to become more and more important in the upcoming years, the power efficiency of such power supplies should be improved.

SUMMARY OF THE INVENTION

It is an object of the present invention to provide a (Power-over-Ethernet) power supply system, a method of power distribution and a computer program for distributing power with an improved power efficiency.

In a first aspect of the present invention, a (Power-over-Ethernet) power distribution is presented. The power distribution system comprises a plurality of loads at least one of which is a lighting unit for producing light. The power distribution system further comprises a first and second switch unit each having a plurality of ports to which one or more of the plurality of loads are coupled. The at least one lighting unit is coupled to both of: at least one of the first plurality of ports and at least one of the second plurality of ports. Each switch unit furthermore comprises a power supply unit for supplying power for the plurality of ports and the loads coupled to these ports. The power distribution system furthermore comprises at least one load management unit for controlling the power supplied to the at least one lighting unit by managing the power supplied from the power supply units to the at least one lighting unit for optimizing the power efficiency of the distribution system and/or optimizing the power efficiency of one or each of the at least two switch units.

The load management according to an aspect of the invention controls or manages the loads at the ports of the switch units by controlling or managing the power supply to the ports. If the power supply to a port is reduced, this also leads to a reduced load at the port. If the power supply to a port is increased, this can also lead to an increased load at the port. The load management can furthermore be performed not to optimize the power efficiency of a load at a port but to optimize the power efficiency of the distributing system.

According to an aspect of the invention, the at least one load management unit is managing the power supply to the at least one lighting unit coupled to the ports of the at least two switch units, based on the capabilities of the lighting unit, the positions of the lighting unit or illumination requirements relating to the lighting unit such that the power distribution system and/or one or each of the at least two switch units is operated at an optimized power efficiency.

According to a further aspect of the invention, the load management unit is adapted to manage the power supply to the switch unit based on a) the relationship between the power efficiency and load characteristics of the power supply units and/or b) the relationship between the power factor and load characteristics of the power supply units. Each power supply unit has a specific power efficiency and load characteristic. The power efficiency is typically optimized for 100 percent load and decreases with decreasing loads. Accordingly, the load management according to an aspect of the invention is performed such that a power supply unit in a Power-over-Ethernet switch unit is operated with an improved power efficiency. This can for example be achieved by reducing the power supply to a port to which a load for example in form of a lighting unit is attached such that the power efficiency of the power supply units is optimized instead of optimizing the power efficiency of the loads.

In a further aspect of the present invention, a method of power distribution is presented. The method comprises supplying power to at least one lighting unit (40-80) coupled to at least one port of a first plurality of ports (25) of a first switch unit (20) and at least one port of a second plurality of ports (35) of a second switch unit (30) by at least one of a first power supply unit (21) in the first switch unit (20) and a second power supply unit (31) in the second switch unit (30), and performing load management by managing the power supplied by the first power supply unit and the second power supply unit to the at least one lighting unit (40-80) such that the power efficiency of the distribution system is optimized.

As typical lighting devices which can be supplied by power via the power distribution system are designed to have their highest efficiency at (a percentage of) their maximum load and as these lighting devices are typically not operated at their maximum load, for example due to energy saving requirements, the power efficiency of a power distribution unit and in particular of a power supply unit in a switch unit is reduced. According to an aspect of the invention, the power efficiency of a switch unit to which several lighting units are coupled is to be improved. The lighting devices (as powered devices) are is controlled by the switch unit such that the lighting requirements are met while the individual lighting devices are controlled such that the overall power efficiency is optimized. This can for example be performed by adjusting the settings for the lighting sources individually.

Hence, the control function according to an aspect of the invention can be implemented in a power sourcing equipment like a Power-over-Ethernet switch unit.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the invention relate to Power-over-Ethernet power supply or distribution units or systems. The elements thereof are based on the IEEE 802.3.af and IEEE 802.3.at standard. The cables between the different elements as described below are Ethernet cables, for example Cat5/6 cables. The Power Sourcing Equipment PSE is coupled to powered devices PD for example in form of lighting sources or lighting devices. The power sourcing equipment PSE is supplying the required voltage and current for the powered devices PD. The cables (Ethernet cables) connecting the power sourcing equipment PSE and the powered devices PD can accordingly be used to transmit data as well as to supply the required power to the powered devices PD. Each power sourcing equipment PSE can be implemented as a Power-over-Ethernet switch unit which can have several ports to which powered devices PD for example in form of light sources or lighting devices can be coupled.

Figure 1:
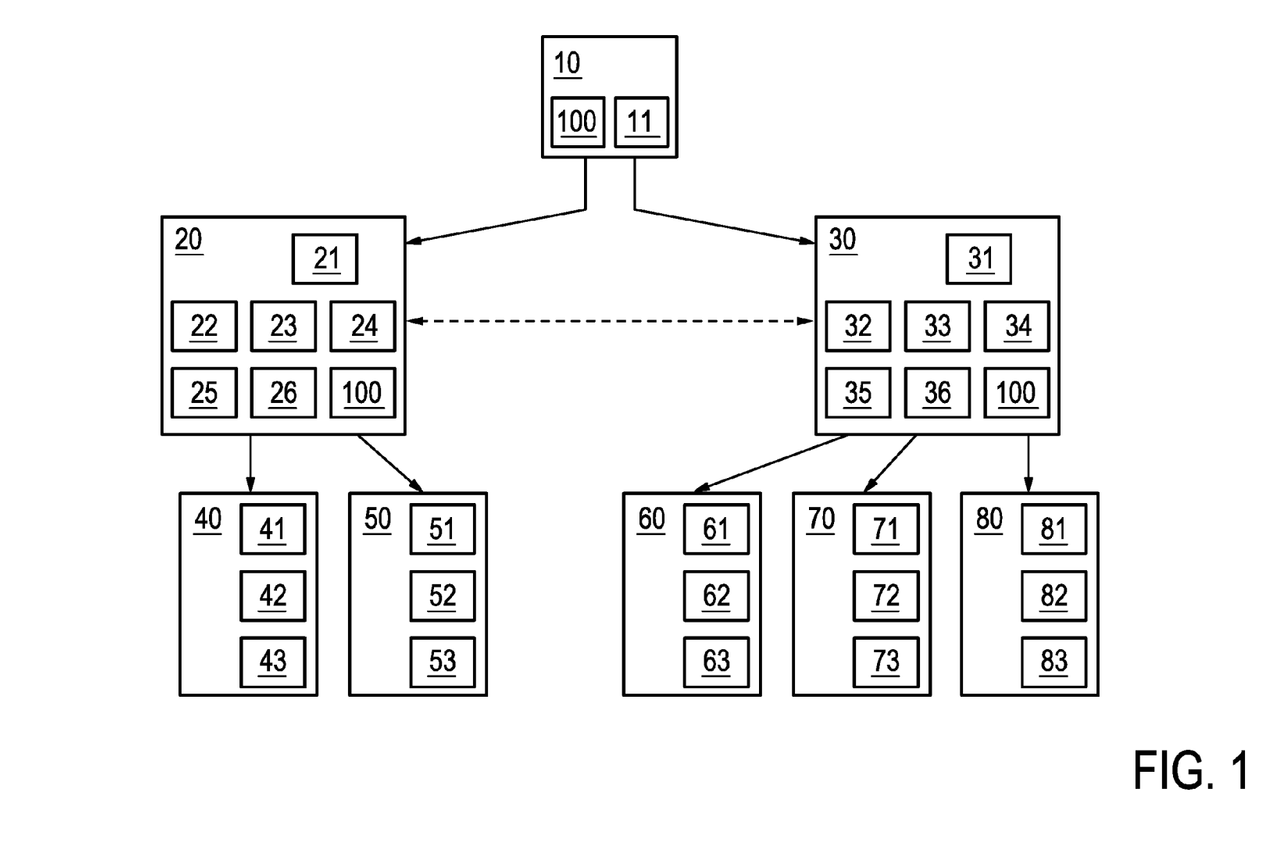
FIG. 1 shows schematically and exemplarily a block diagram of a power distribution system according to an embodiment of the invention.

FIG. 1 shows schematically and exemplarily a block diagram of a power distribution system according to an embodiment of the invention. In FIG. 1, the basic environment or structure of a Power-over-Ethernet power distribution system is schematically depicted. Optionally, a central controller 10 can be coupled to a plurality of power sourcing equipment PSE, for example in form of Power-over-Ethernet switches or switch units 20, 30. The Power-over-Ethernet switch units 20, 30 in turn can be coupled to a number of powered devices PD for example in form of lighting units 40, 50, 60, 70, 80. In the embodiment of FIG. 1, the first Power-over-Ethernet switch unit 20 is coupled to two lighting units 40, 50. The second Power-over-Ethernet switch unit 30 is coupled to three lighting units 60, 70, 80. However, it should be noted that this is just one example. In fact, a plurality of Power-over-Ethernet switch units can be provided which can each in turn be coupled to a number of powered devices PD for example in form of lighting units. The Power-over-Ethernet switch units 20, 30 can act as power sourcing equipment PSE, i.e. they are used to supply power to the powered devices PD in form of the lighting units 40-80, respectively. The Power-over-Ethernet switch units 20, 30 are coupled to the powered devices 40-80 by means of Ethernet cable (e.g. Cat5/6 cables).

Each of the Power-over-Ethernet switch units 20, 30 can comprise a controller 21, 31, a power supply unit PSU 22, 32 and a switch 23, 33. Furthermore, each Power-over-Ethernet switch 20, 30 can comprise a number of ports 25, 35 to which the powered devices PD for example in form of the lighting units can be coupled. The Power-over-Ethernet power sourcing equipment, i.e. the Power-over-Ethernet switch units, may also optionally comprise a voltage or current sensor 26, 36 or a detecting unit for detecting the voltage and the current at the ports 25, 35 of the switch unit 20, 30. Optionally, the Power-over-Ethernet switch units 20, 30 can also be used to transmit data to and from the powered devices PD based on the Ethernet cables and based on Ethernet communication protocols.

Powered devices PD can in general be divided into different classes as the powered devices may use different power amounts to be operated. The classification of the power requirements of different powered devices are defined in the IEEE 802.3.af and IEEE 802.3.at standard.

Each of the powered devices, i.e. each of the lighting units 40-80 may comprise a driver 41, 51, 61, 71, 81 and a light unit 42, 52, 62, 72, 82 for emitting light. Optionally, the lighting devices 40-80 each can comprise a controller 43, 53, 63, 73, 83. The drivers 41, 51, 61, 71, 81 each serve to drive the light units 42, 52, 62, 72, 82, respectively. Accordingly, for example based on information received from the central controller 10 or from the Power-over-Ethernet switch units 20, 30, a driver 41-81 drives the operation of the light unit, thus controlling the output of the light unit between 0 and 100%. In other words, optionally a central controller sends a command to the controller in the light device to dim the light unit down/up. A light controller can translate a dim command into a control signal for the driver, which will change LED current and light output and also the load. The power sourcing equipment PSE or the switch unit 20, 30 will measure load change (e.g. via the voltage and current measured by the sensor 25, 36 at the ports 25, 35 and sent this information back to the central controller.

The lighting units can for example be implemented as light emitting devices LED or any other light sources which are dimmable. In addition or alternatively to the usage of LED, OLED can used. Furthermore, the Power-over-Ethernet power distribution system can also be used to supply AC light sources with power. In such a case, a DC/AC converter is needed for the AC light sources to convert the DC supplied by the Power-over-Ethernet system into AC. Such AC light sources can be halogen lamps, high-intensity discharge HID lamps, compact fluorescent CFL lamps, etc.

As the powered devices PD are coupled to the power sourcing equipment PSE (i.e. Power-over-Ethernet switch units 20, 30), the powered devices PD act as loads for the power sourcing equipment PSE. According to the operation of the powered devices (according to this embodiment, the lighting units 40-80), the power sourcing equipment PSE must provide different amounts of power for the powered devices PD at the respective ports 25, 35. Each of the lighting units 40-80 as powered devices PD are designed to have a maximum power efficiency. However, in order to improve the overall power efficiency of the Power-over-Ethernet distribution system, all of the lighting units 40-80 and the switch units 20, 30 in the system must be considered. To optimize the overall power efficiency according to this embodiment, a load management in particular in view of the lighting units 40-80 as powered devices PD is provided. The load management can be performed by a load management unit 100 which can be arranged in the control units 21, 31 of the Power-over-Ethernet switch units 20, 30 and/or in the control unit 11 of the central controller. Alternatively or additionally, a load management unit 100 can be provided as a dedicated unit separate from the Power-over-Ethernet switch units and/or the central controller 10.

According to an embodiment of the invention, the load management unit 100 receives a reference illumination value or a set of reference illumination values as input and controls the operation of the lighting units 40-80 (and thereby the loads at the parts of the switch units) in order to provide an illumination which corresponds to the reference illumination value or the set of reference illumination values while the power efficiency of the overall system is optimized instead of the power efficiency of the lighting unit or Power-over-Ethernet switch unit separately. In fact, if the power efficiency of the lighting units and/or the Power-over-Ethernet switch units are optimized individually or separately, this may not lead necessarily also to an optimized power efficiency of the entire system.

In the following, the load management according to the embodiments of the invention will be described in more detail.

Figure 2A:
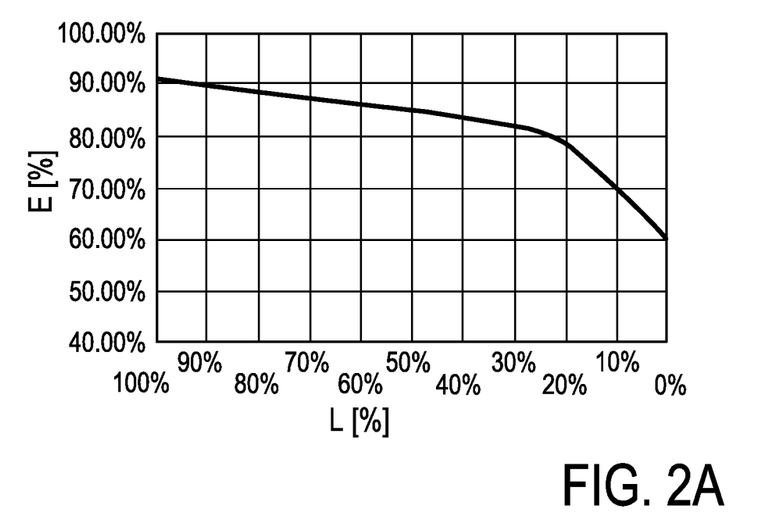
FIG. 2A shows a schematic graph indicating the dependency of the efficiency of a supply unit in view of a load applied to it.

FIG. 2A shows a schematic graph indicating the dependency of the efficiency of a power supply unit of a power sourcing equipment in view of a load applied to it according to an embodiment of the invention. In FIG. 2A, the efficiency E is shown as the efficiency in % and the load L is shown in % of the rated output power. As can be seen from FIG. 2A, the efficiency E drops from above 90% at 100% load to 60% at a load of 0%. In other words, the power supply unit is designed to have its maximum efficiency at 100% load. If the system according to FIG. 1 is to be operated at maximum efficiency, each of the supply units must be operated at 100% load. This is, however, not possible as this would contradict any power saving schemes. The implementation of energy saving algorithms (day light regulation, occupancy detection, personnel control, etc.) will thus lead to a reduced overall efficiency.

Figure 2B:
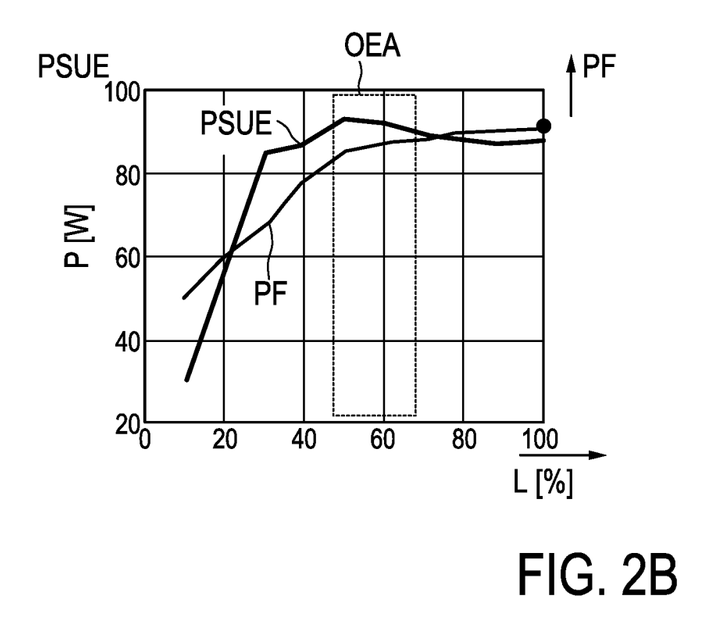
FIG. 2B shows a graph indicating the relation between the load and the efficiency of a power supply unit as well as the relation between the power factor and the load applied to the power supply unit.

FIG. 2B shows a graph indicating the relation between the load and the efficiency of a power supply unit as well as the relation between the power factor PF and the load applied to the power supply. In FIG. 2B, the load L and the efficiency E are again depicted in %. The graph PSUE shows the relation between the load L and the efficiency E of the power supply unit. In addition, the dependency of the power factor PF on the load L is depicted by the graph PF. The power factor PF is the relation between the real and apparent power in the power supply unit. As can be seen from FIG. 2B, the power factor PF will increase with increasing load. A high power factor corresponds to a higher amount of real power and a low power factor corresponds to a lower amount of real power and thus more apparent power. In FIG. 2B, an optimized efficiency area OEA is depicted. This area extends from approximately 50 to 70% load L. In this area, the PSUE efficiency is the highest while at the same time, the power factor PF is still accepted. Hence, the optimum power efficiency E is at around 60% load. As can be seen from FIG. 2A, a 60% load only results in an approx. 5% reduction of the efficiency. As can also be seen from FIG. 2A, the efficiency of the power supply unit is very low (approx. 70% at a load of 10%). Hence, increasing the load and therefore the light output can result in an increased power efficiency (60% instead of 10%) and therefore in a decreased power consumption.

The above-mentioned correlation between the load and the power efficiency is not based on a straight forward conclusion as typically one would expect that the power consumption is increased if a load applied to the power supply unit is also increased. According to an aspect of the invention, this correlation is used in the load management according to an embodiment of the invention to increase the power efficiency of the system.

As mentioned above, in FIG. 2B, the relation between the power factor PF and the applied load to the power supply unit is also depicted. If the power factor PF is low, for example for loads below 30%, the system must provide a considerable amount of reactive energy or apparent energy. If the reactive energy or apparent power is increased, this leads to a decrease of the real power. Furthermore, the entire system must be able to provide the required reactive power. In the power distribution system according to FIG. 1, a distribution transformer (not shown) must be provided to supply the required reactive energy. The distribution transformer is not depicted in FIG. 1. If the distribution system is operated at a low efficiency and a low power factor, this would require distribution transformers that are bigger than those that are actually required in an embodiment. By applying the load management according to an embodiment of the invention, the power factor PF can be taken into account while still providing the reference illumination values.

The load management according to an embodiment of the invention uses these realizations in order to increase the power efficiency of the system. As the purpose of the distribution system of FIG. 1 is to provide light or illumination in a building or several rooms, the power sourcing equipment, i.e. the Power-over-Ethernet switch units 20, 30, supply the powered devices, i.e. the lighting units 40-80 each with a respective power amount to achieve the required illumination. In order to improve the power efficiency of the entire system, the power supplied to the respective lighting units 40-80 can be changed in order to achieve the required load of for example 60% for the Power-over-Ethernet switch units 20, 30. This can for example be performed by reducing the power supply to some of the lighting units while increasing the power to some of the other lighting units. For example loads at the ports of the Power-over-Ethernet switch units which operate at only 10% (as explained with reference to FIGS. 2A and 2B) should be avoided. Here, other lighting units in the vicinity or proximity of the first lighting unit may be supplied with a higher power such that respective load can be increased. In other words, the load at a first port may be decreased while the load at a second port may be increased. This variation in the supplied power must, however, take into account that the required illumination should be provided. To put it in other words, the illumination of one lighting unit is reduced while the illumination of a second lighting unit is increased to provide the overall lighting requirements or constraints such that the user will not notice the difference. However, the power efficiency of the overall system will increase.

Figure 3:
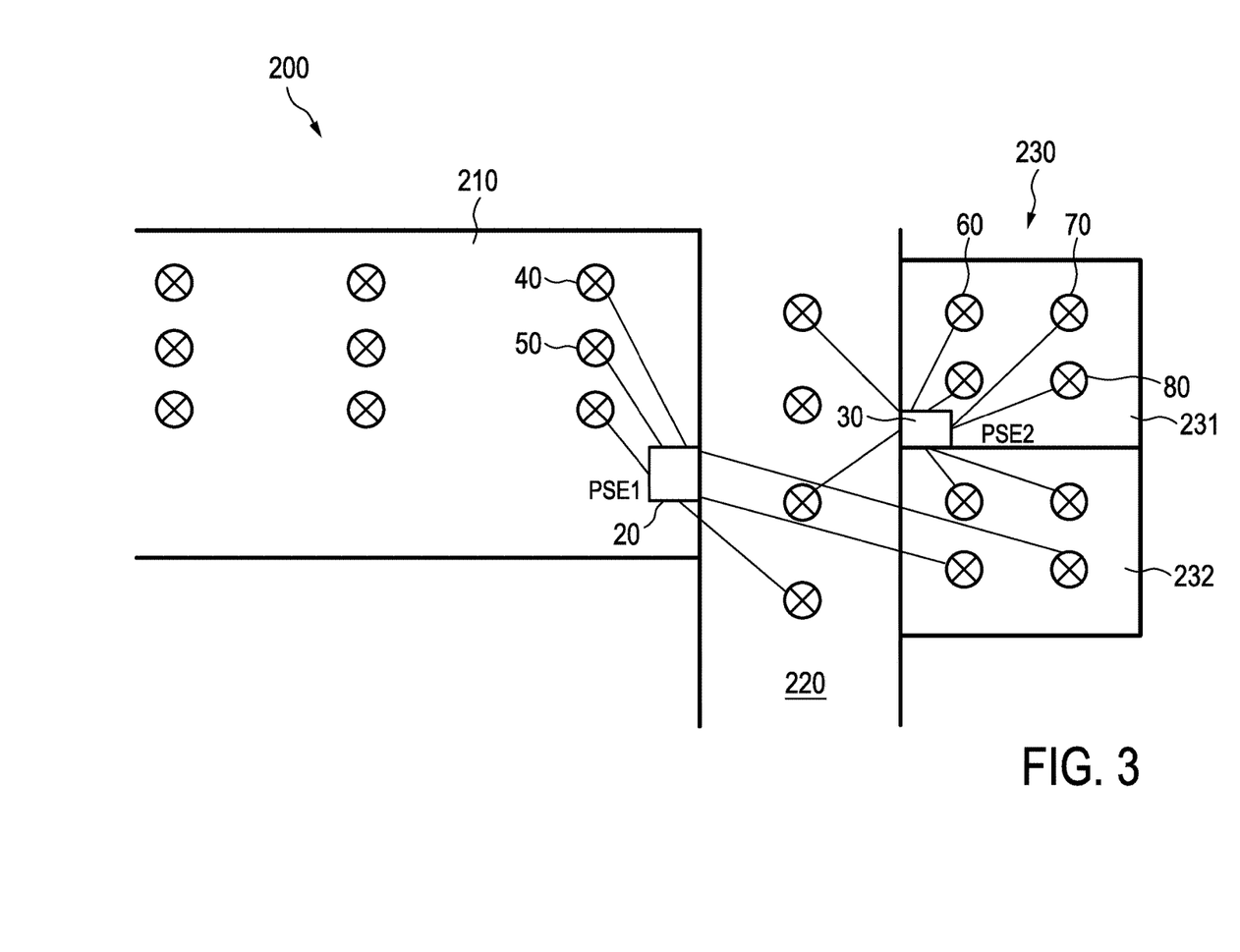
FIG. 3 shows a schematic illustration of a Power-over-Ethernet distribution system in a building according to an embodiment of the invention.

FIG. 3 shows a schematic illustration of a Power-over-Ethernet distribution system in a building according to an embodiment of the invention. In FIG. 3, a building 200 is depicted having for example a meeting room 210, a hallway 220 and several cell offices 230, 231, 232. In the building, two Power-over-Ethernet switch units 20, 30 are depicted, which are coupled to the lighting units 40-80. The first Power-over-Ethernet switch unit 20 may be coupled to lighting units in the meeting room 210 as well as in the hallway 220. The second Power-over-Ethernet switch unit 30 may be connected to lighting units in the hallway 220 as well as in the cell offices 230-232. The Power-over-Ethernet switch units according to FIG. 3 can correspond to the Power-over-Ethernet switch units according to FIG. 1. In other words, the Power-over-Ethernet switch units 20, 30 provide power for the lighting units 40-80 which act as powered devices PD.

In an aspect of the invention, the Power-over-Ethernet switch unit will control those lighting units which are arranged in the same room to provide for the required illumination. This could for example mean that the light output of one lighting unit is increased while the light output of a second lighting unit is decreased.

In a further aspect of the invention, as is shown in FIG. 3, for example in the hallway 220 as well as in the cell office 230, lighting units are present which are coupled to the first switch unit 20 as well as to the second switch unit 30. In order to optimize the overall power efficiency while providing the required illumination, the first and second Power-over-Ethernet switch units 20, 30 may communicate. For example, those lighting units which are coupled to the second switch unit 30 and which are arranged in the cell office 232 can be activated with high loads (and thus higher power) while the lighting units which are coupled to the second switch unit 20 and which are arranged in the cell office 232 can be switched off such that they are not operated. Alternatively, one of the lighting units associated with the second switch unit 30 can be activated and the second one can be deactivated while a lighting unit associated to the first switch unit is activated while the second one is deactivated. Hence, the first and second switch units each operate one lighting unit in the cell office 232. The loads at the ports of the switching units are controlled such that they are at a certain percentage where the power efficiency of the power supply units is in at least an acceptable range while still having the illumination requirements in mind.

In a further aspect of the invention, the switch units 20, 30 may communicate with a central controller 10 as depicted in FIG. 1. In other words, the switching units 20, 30 can communicate directly or indirectly via a central controller 10.

Figure 4:
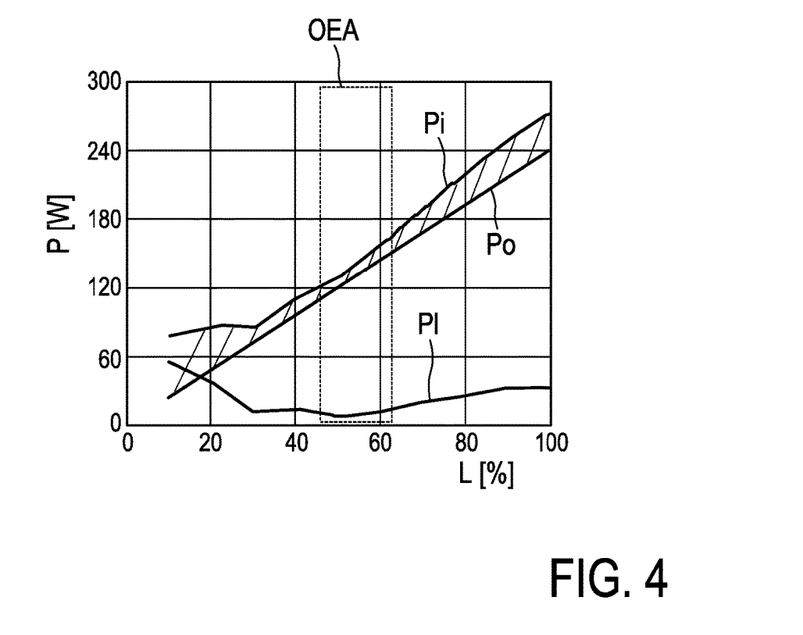
FIG. 4 shows a schematic graph indicating the relation between the load and the power supply to the power distribution unit according to an embodiment of the invention.
Figure 5:
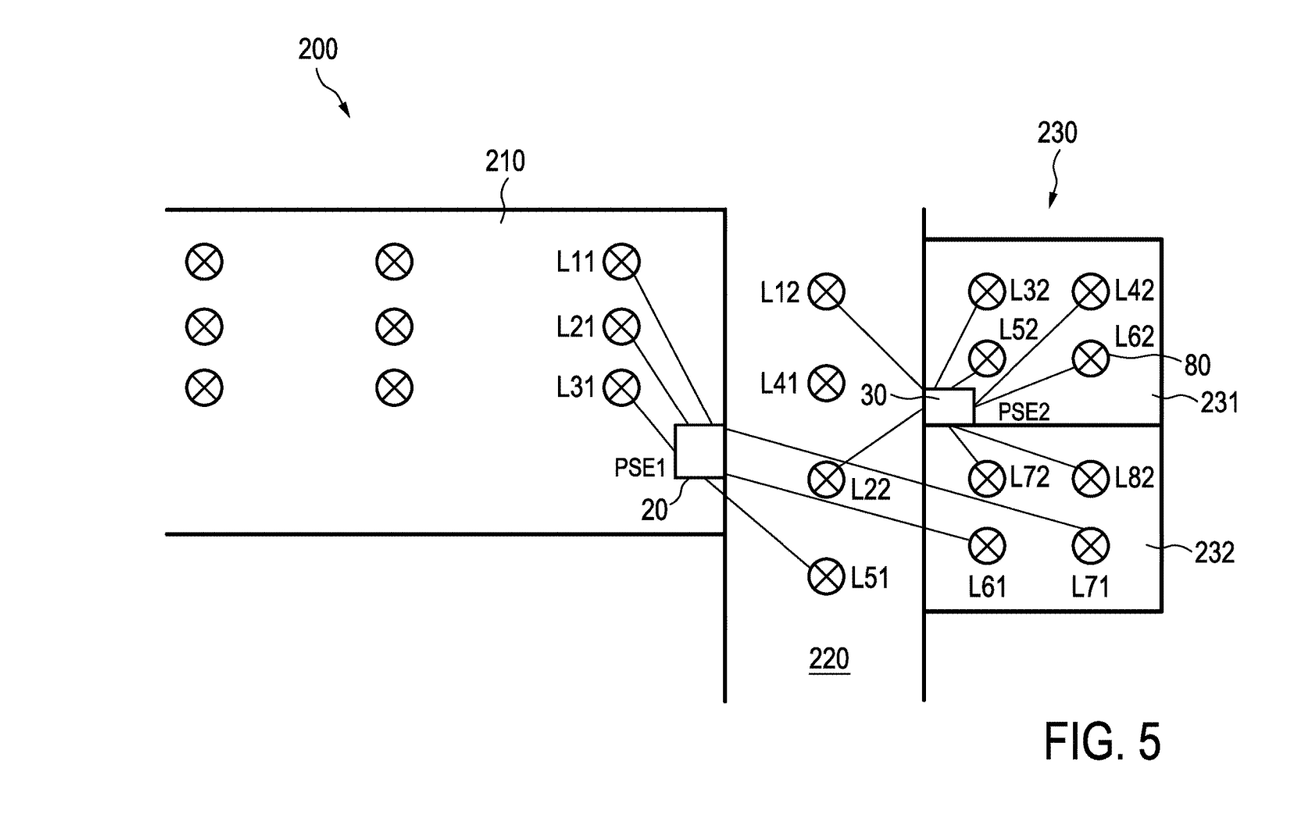
FIG. 5 shows a schematic illustration of a Power-over-Ethernet distribution system in a building according to an embodiment of the invention.

FIG. 4 shows a schematic graph indicating the relation between a load and the power supply to power distribution units according to an embodiment of the invention. In FIG. 4, the power P in watts is shown in relation to the load L in percent. In FIG. 4, the input power Pi, the output power Po and the power loss Pl are depicted. Furthermore, an optimized efficiency area OEA is depicted. This area corresponds to the area where the power loss is at a minimum value, i.e. this area is somewhere in between 45 and 65% of the load. The relation between the load and the power loss is depicted below:

FIG. 5 shows a schematic illustration of a Power-over-Ethernet distribution system in a building according to an embodiment of the invention. As in the embodiment of FIG. 3, a building 200 can comprise a meeting room 210, a hallway 220 and several cell offices 230-232. Furthermore, a first and second Power-over-Ethernet switch unit 20, 30 are provided which are each coupled to a number of lighting units. In the embodiment of FIG. 5, lighting units L11, L21, L31, L51, L41 are coupled to ports of the Power-over-Ethernet switch unit 20. The lighting units L12, L32, L42, L52, L62, L72, L82 and L22 are coupled to ports of the second Power-over-Ethernet switch unit 30. Therefore, for example the lighting unit L11 in FIG. 5 can correspond to the lighting unit 40 in FIG. 3 etc. As described above with reference to FIG. 3, the Power-over-Ethernet switch units 20, 30 are each used as Power Sourcing Equipment PSE to provide a power to the different lighting units as powered devices PD. Each of the Power-over-Ethernet switch units 20, 30 can comprise a control unit with a load management unit 100. Alternatively or additionally, the first and second Power-over-Ethernet switch unit 20, 30 can be coupled to a central controller 10 (not depicted in FIG. 5). The central controller 10 can also comprise a load management unit 100 for performing the load management according to an embodiment of the invention.

The first and second Power-over-Ethernet switch units 20, 30 can have a number of ports 25, 35 to which the different lighting units are connected or coupled. The Power-over-Ethernet switch units 20, 30 can also comprise sensors 26 for detecting the current and the voltage at their respective ports 25, 35. The first and second Power-over-Ethernet switch units 20, 30 can also have means for communication with the lighting units.

Optionally, a sensor for detecting the illumination in the meeting room, the hallway and/or the cell offices can be provided as a feedback means in order to ensure that the required illumination is present in the different rooms of the building. The load management unit 100 is used to adjust the output power at each of the ports of the Power-over-Ethernet switching units 20, 30 in order to optimize the power efficiency of the Power-over-Ethernet switches as well as the entire distribution system while still being able to provide the required illumination in the meeting room, the hallway or the cell offices.

According to an aspect of the invention, the power supplied at the respective ports of the Power-over-Ethernet switch units 20, 30 is selected such that the overall load for the switch units or the power supply unit 21, 31 is according to one embodiment approximately 60%. By the sensors 26 in the switching units, the voltage and the current drawn by the powered devices is detected. Based on these measurement values, the load at each port is calculated and the overall load will then correspond to the sum of the loads at each of the ports of the switching unit.

By means of the load management unit 100, the power outputted at the ports of the switch units are selected such that the overall power efficiency is optimized. For example, this can be done by reducing the light output of a first light unit 40 while increasing the light output of a second light unit 50 in order to achieve a required illumination value.

| Load % | 10 | 20 | 30 | 40 | 50 | 60 | 70 | 80 | 90 | 100 |
|---|---|---|---|---|---|---|---|---|---|---|
| Pl Watt | 56 | 39.273 | 12.706 | 14.345 | 9.032 | 12.522 | 20.764 | 26.182 | 32.276 | 32.727 |

Table 1 shows two load cases for the situation in FIG. 5.

TABLE 1

| Luminaire nr | PSE1 | | Luminaire nr | PSE2 | |
| --- | --- | --- | --- | --- | --- |
| L11 | 10 | 15 | L12 | 30 | 20 |
| L21 | 10 | 15 | L22 | 30 | 20 |
| L31 | 10 | 15 | L32 | 90 | 80 |
| L41 | 30 | 50 | L42 | 90 | 80 |
| L51 | 30 | 50 | L52 | 90 | 80 |
| L61 | 70 | 80 | L62 | 90 | 80 |
| L71 | 70 | 80 | L72 | 70 | 60 |
| L81 | 0 | 0 | L82 | 70 | 60 |
| Total Load | 30 | 40 | Total Load | 70 | 60 |

Here, it can be seen that the overall load for the case 1 (30+70) corresponds to the overall load for the case 2 (40+60).

Figure 6:
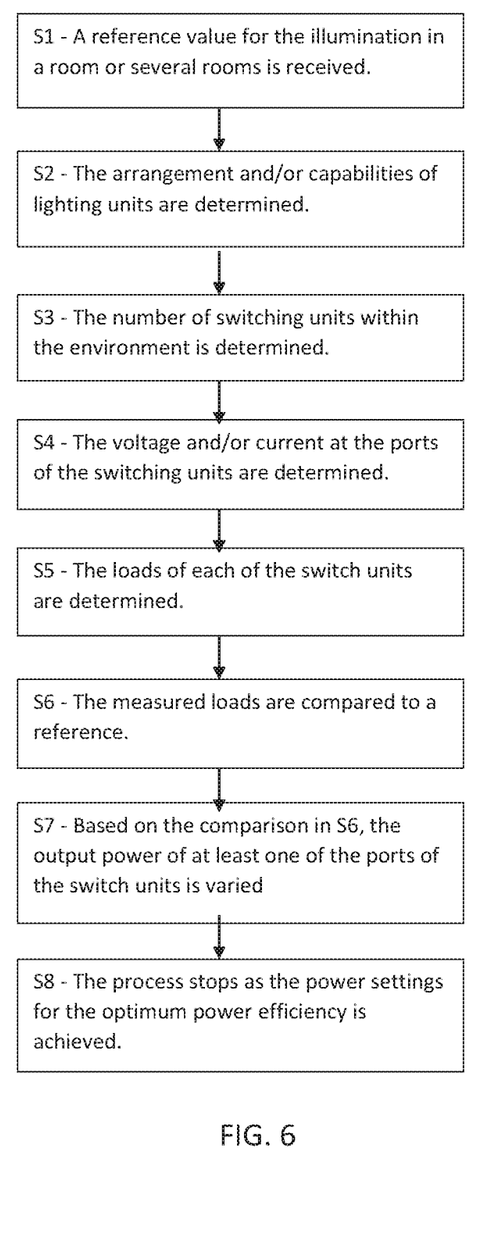
FIG. 6 shows a flow chart of a load management process according to an aspect of the invention.

FIG. 6 shows a flow chart of a load management process according to an aspect of the invention. In step S1, a reference value for the illumination in a room or several rooms is received. In step S2, the arrangement and/or capabilities of lighting units are determined. The number of switching units within the environment is determined in step S3. In step S4, the voltage and/or current at the ports of the switching units can be determined. In step S5, the loads of each of the switch units are determined. In step S6, the measured loads are compared to a reference. Based on the comparison in step S6, the output power of at least one of the ports of the switch units is varied. In step S8, the process stops as the power settings for the optimum power efficiency is achieved.

The above described process of load management can be performed at regular intervals or once the lighting system is activated.

The above described load management and the Power-over-Ethernet power distribution system can for example be used in a lighting system of an office. The lighting system will have standard default lighting settings according to the EN12464 standard. Hence, the illumination for a desk should e.g. be >500 lux. The lighting environment will be defined according to the lighting design which includes the light output of the lighting devices, maintenance factors, the size and type of the lightings or luminaires. The lighting requirements may be different for different parts of an office. For example, the lighting requirements are different for a hallway as compared to a desk area or a cell-office or a meeting area. The information regarding the environment of the illumination system or lighting system can be programmed, included or made available into the lighting system. The load management system can have access to this data and information. Each of the lighting devices can be coupled to a port of a power sourcing equipment PSE such that the lighting devices can be supplied with power. The load management unit will also have access to information regarding the configuration or commission of the lighting system which includes the position of lighting devices in the building, the number of lighting devices, the light behavior of the devices, the room types (cell-office, meeting room, etc.) where lighting devices are present. In other words, the load management unit can have access to the entire environment and arrangement of the lighting system. In addition, the load management unit can also have access to the control algorithm of the lighting system such as the energy saving algorithms. The control algorithms will define the light output of the lighting units and thus the load of the lighting units. The light output and therefore the load can, however, change as a function of daylight and/or whether the room is occupied or not.

The load management will be performed such that the actual illumination and thus the light output of the system will remain the same the designated areas while the load of the entire system is optimized in view of the power efficiency.

According to an embodiment of the invention, a lighting system is provided which comprises a Power-over-Ethernet distribution system to which a plurality of lighting units is coupled. The Power-over-Ethernet distribution system serves to provide the power for the different lighting units. The distribution system comprises a load management unit for managing the loads at the Power-over-Ethernet switching units in order to achieve an optimized power efficiency and/or an optimized power factor.

According to a further embodiment of the invention, the load management can be performed indirectly. The load management units can perform the load management by instructing the lighting units to change their loads. The load management units can therefore be able to initiate a load change of the light units as required by the overall load management.

According to an alternative embodiment of the invention, an eMerge DC distribution system can be provided based on the same principles as above. The eMerge is a DC standard used mainly for lighting in US offices (see www.emergealliance.org).

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the assignments of the sensors to the dominant and non-dominant classes, the provision of the power for the power distribution systems et cetera performed by one or several units or devices can be performed by any other number of units or devices. These procedures and the control of the power distribution system in accordance with the power distribution method and/or in accordance with the assigning method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. Power-over-Ethernet power distribution system, comprising
    a plurality of lighting units for producing light according to illumination requirements, each lighting unit comprises a driver and a light unit for emitting light,
    a plurality of Power-over-Ethernet switch units each having a plurality of ports, to which the lighting units are coupled via Ethernet cables, and a power supply unit for supplying power for the plurality of ports and the lighting units coupled to the ports, at least one load management unit for controlling the power supplied to each of the lighting units coupled to the ports by managing the power supplied from the power supply unit, using the plurality of ports, to the lighting units to influence loads, which each of the lighting units represent at the ports by instructing at least one lighting unit to change its load, based on capabilities of the lighting units, positions of the lighting units, and the illumination requirements or constraints such that each of the plurality of Power-over-Ethernet switch units is operated at an optimized power efficiency by, based on the at least one lighting unit changed load, increasing a load to one port of the plurality of Power-over-Ethernet switch units and decreasing a load to another port of the plurality of Power-over-Ethernet switch units while maintaining the illumination requirement, and wherein the load management unit is adapted to manage the power supplied to the ports of the plurality of Power-over-Ethernet switch units based on a) power efficiency and load characteristics of the power supply units and/or b) power factor and load characteristics of the power supply units.

2. The Power-over-Ethernet power distribution system according to claim 1, wherein
the illumination requirements include light output requirements.

3. The Power-over-Ethernet power distribution system according to claim 1, wherein the at least one load management unit adjusts a light setting for a lighting unit coupled to a respective port of a switch unit until a predetermined threshold of power efficiency is achieved.

4. The Power-over-Ethernet power distribution system according to claim 1, wherein each of the plurality of Power-over-Ethernet switch units is operated at an optimized power efficiency by increasing or decreasing a load to one or more of the ports of the plurality of Power-over-Ethernet switch units to obtain an entire Power-over-Ethernet power distribution system load between 50% to 70% as applied to the Power-over-Ethernet switch units.

5. Method of distributing power in a Power-over-Ethernet power distribution system, comprising the steps of:
producing light according to illumination requirements by a plurality of lighting units, each having a driver and a light unit for emitting light,
coupling the lighting units to ports of a plurality of Power-over-Ethernet switch units,
supplying power for the plurality of ports and the lighting units coupled to the ports by a power supply unit in the at least one Power-over-Ethernet switch units, and
performing a load management by controlling the power supplied to each of the lighting unit coupled to the ports by managing the power supplied from the power supply unit, using the plurality of ports, to the lighting units to influence loads, which each of the lighting units represent at the ports by instructing at least one lighting unit to change its load, wherein the at least one load management unit control of the power supplied to each of the lighting units is based on capabilities of the lighting units, positions of the lighting units, and the illumination requirements or constraints such that each of the plurality of Power-over-Ethernet switch units is operated at an optimized power efficiency by, based on the at least one lighting unit changed load, increasing a load to one port of the plurality of Power-over-Ethernet switch units and decreasing a load to another port of the plurality of Power-over-Ethernet switch units while maintaining the illumination requirement, and
wherein the load management is performed based on a) power efficiency and load characteristics of the power supply units and/or b) power factor and load characteristics of the power supply units.

6. A computer program for distributing power within a Power-over-Ethernet power distribution system, the computer program comprising program code means for causing the Power-over-Ethernet power distribution system to carry steps out of the power distribution method as claimed in claim 5, when the computer program is run on a computer controlling the Power-over-Ethernet power distribution system.

7. Method of distributing power in a Power-over-Ethernet power distribution system, comprising the steps of:
producing light according to illumination requirements by a plurality of lighting units, each having a driver and a light unit for emitting light,
coupling the lighting units to ports of a plurality of Power-over-Ethernet switch units,
supplying power for the plurality of ports and the lighting units coupled to the ports by a power supply unit in the at least one Power-over-Ethernet switch units, and
performing a load management by controlling the power supplied to each of the lighting unit coupled to the ports by managing the power supplied from the power supply unit, using the plurality of ports, to the lighting units to influence loads, which each of the lighting units represent at the ports by instructing at least one lighting unit to change its load, wherein the at least one load management unit control of the power supplied to each of the lighting units is based on capabilities of the lighting units, positions of the lighting units, and the illumination requirements or constraints such that each of the plurality of Power-over-Ethernet switch units is operated at an optimized power efficiency by increasing or decreasing one or more loads to the ports of the plurality of Power-over-Ethernet switch units such that a predetermined entire system load is obtained in Power-over-Ethernet switch units while maintaining the illumination requirement.

* * * * *